United States Patent [19]

Lennartsson

[11] Patent Number: 5,383,116
[45] Date of Patent: Jan. 17, 1995

[54] DEVICE FOR CONTROLLING A MEMBER IN A SYSTEM

[75] Inventor: Kent Lennartsson, Malmö, Sweden

[73] Assignee: Kvaser Consultant AB, Kinnahult, Sweden

[21] Appl. No.: 956,780
[22] PCT Filed: Jun. 10, 1991
[86] PCT No.: PCT/SE91/00414
   § 371 Date: Dec. 17, 1992
   § 102(e) Date: Dec. 17, 1992
[87] PCT Pub. No.: WO91/20019
   PCT Pub. Date: Dec. 26, 1991

[30] Foreign Application Priority Data

Jun. 17, 1990 [SE] Sweden .................. 9002155

[51] Int. Cl.$^6$ .................................................. G06F 15/46
[52] U.S. Cl. .................................. 364/138; 364/132; 364/DIG. 1; 364/230.4; 364/240.8; 395/200
[58] Field of Search .................... 364/176, 131–136, 364/177, 138, 139, 184–187, 468, 478, DIG. 1 MS File, DIG. 2 MS File; 340/825.06, 825.07; 395/200, 325

[56] References Cited

U.S. PATENT DOCUMENTS

| | | | |
|---|---|---|---|
| 4,304,001 | 12/1981 | Cope | 340/825.01 X |
| 4,841,450 | 6/1989 | Fredrickson | 364/468 |
| 4,992,950 | 2/1991 | Francisco | 364/132 X |
| 5,003,485 | 3/1991 | Francisco | 364/132 X |
| 5,053,964 | 10/1991 | Mister et al. | 364/132 X |
| 5,072,374 | 12/1991 | Sexton et al. | 364/132 X |

FOREIGN PATENT DOCUMENTS 0262624  4/1988  European Pat. Off. .

OTHER PUBLICATIONS

Automatic Operating Device With Learning Function, 62-137607 (A) 20.6.19887 JP Appl. No. 60-279671 Nov. 12, 1985, Mitsubishi Electric Corp., Yasushi Kamiyama, Int. Cl. G05B13/02, G01M1500, G05B21/02, vol. 11, No. 362 (P-640).
Pulse Distribution Circuit Numerical Controller, 58-175004 (A) Oct. 14, 1983, JP. Appl. No. 57-57225, Apr. 8, 1982, Hitachi Seisakusho K.K, Masayoshi Oozeki, Int. Cl. G05B19/407, vol. 8, No. 14 (P-249).

*Primary Examiner*—Joseph Ruggiero
*Attorney, Agent, or Firm*—Pollock, Vande Sande & Priddy

[57] ABSTRACT

An apparatus or manufacturing system in which a first member executes a desired function or action which is controllable as a function of at least one parameter characteristic for a second member is provided. A first detector detects signals corresponding to values of the at least one parameter of the second member. At least one transmitter receives the detected signals and assigns coded/numbered messages for each value of the parameter. The apparatus further includes at least one receiver with a control module for controlling the desired action of the first member. The signal transmission between the transmitter and the receiver occurs over a connection bus and the signals are transmitted in the form of the coded/numbered messages in a predetermined order, with well defined transmission times between the first detector and the transmitter and between the transmitter and the receiver. A control unit controls operation of the receiver module and send thereto at least information regarding a desired parameter value at which a corresponding desired function or action is to be executed by the first member, or a desired message number to be selected. The receiver obtains the requested desired message number or, based on the desired parameter value and the time information for the desired action or function of the first member selects itself and receives a corresponding message number containing the parameter value. Based on the message number the receiver generates an activation signal for the first member.

16 Claims, 3 Drawing Sheets

DEVICE FOR CONTROLLING A MEMBER IN A SYSTEM

FIELD OF THE INVENTION

The present invention relates to a device for preventing the function of a system being affected on account of a first member in the system being impaired by, for example, manufacturing irregularities, supplier variations, being exposed to external and internal environmental influences, or operating with a function which is dependent on the material, units or parts which the first member will act upon in the system which can be a product-generating system. The device is furthermore of the type in which the first member is controlled from a second member, for example as a function of the movements, state and the like of the second member. The invention also relates to a method in conjunction with the device.

BACKGROUND OF THE INVENTION

It is previously known to correct or compensate for deficiencies and manufacturing variations in a given member which forms part of a system. The member can, for example, be manufactured with greater tolerance accuracy or be made to cooperate with incorporated or connected compensating devices which compensate for changes in, for example, temperature. In cases where the system requires rapid functioning of the first member and the latter operates with a comparatively great inertia, it is previously known to arrange for the first member to be controlled such that it is acted upon in advance in order to compensate for the inertia. It is also previously known, with communication protocols which operate with well-defined time transmission of signals and in similar arrangements, to use a message system in which the messages are numbered and transmitted in a predetermined order, for example in an order which corresponds to the message numbering.

In systems of the above type, there is often a significant requirement to achieve very accurate operation of the system. This is made difficult by the fact that components incorporated in the system are sensitive to external and internal factors which result in their dependence upon manufacturing tolerances, exchange of brand, temperatures or other factors. It is also a great advantage for the system to have a structure which comprise technically simple and economically advantageous components. The last-mentioned requirements conflict with the requirement for great system accuracy, since such accuracy presupposes accurately manufactured components which are incorporated in a non-critical cooperating function in the system.

The present invention proposes a device and a method which solve, among other things, the above-mentioned problems. By means of the invention, the mechanical deficiencies of the components involved can be compensated by a system function which is built into a software used. This can be designed so that the mechanical deficiencies are easily compensated.

In systems of the relevant type, there are also difficulties in generating and transmitting the signalling from the second member to the first member so that clear function executions are obtained from the first member. It is desirable to use and deal with information from a non-intelligent pulse source (sensor) for producing exact function executions in the first member. It is also desirable to be able to make the components easily exchangeable in the system without the latter having to be subjected to modification on account of the replacement. It is also desirable to be able to make the system useable for system changes. In some connections it will perhaps be desirable to use simpler and less expensive components than those already in place, or vice versa. The signal transmission will be non-critical and receiving and separating true signals from interference signals will be salient. It is also in some cases advantageous to be able to use known, well-proven communication protocols, even where these are in principle intended for other signal handling, for example prioritizing messages. This concerns in particular those circuits in which the protocol handling is built into hardware, that is existing known systems (for example CAN, SDLC, GPIB, Multibus, and the like) are used in an entirely different way.

In a system where certain events will result in functions in other parts of the system, the signal is normally transmitted directly from the sensor to the unit which will execute the function. Since many events will take place in a machine, this requires a great quantity of conductors, and the unit which delivers the signal on these conductors must take into account the delays which can occur on the way from where the output signal arises to where the desired function is effected.

The new device and the new method according to the present invention are intended to solve the above problems in an advantageous manner.

SUMMARY OF THE INVENTION

The features which can principally be regarded as being characteristic of the new device are, among other things, that the system comprises transmitter and receiver and, arranged therebetween, a connection in the form of a bus connection. The transmitter receives signals which relate to the particular parameter or parameters of the second. The receiver member can form or be connected to a control module for the first member. The transmission between the transmitter and receiver is effected by means of a message system in which the messages are preferably numbered and can be transmitted from the transmitter to the receiver in a certain order via the bus connection. The first detection member signals, are assigned message numbers as a function of each parameter value. The lowest parameter value is preferably assigned the lowest message number, the next-lowest parameter value is assigned the next-lowest message number and the like. A communication protocol which operates with a great time accuracy is used in this connection, and examples which can be used are communication protocols CAN, TRAINET, and the like which are known on the market. The transmission times in the signalling between the first detection member and the transmitter member and between the transmitter and receiver are in this way well defined. An adjustment of the first member to the desired parameter value by means of a control means incorporated in the system, for example a master unit, causes the receiver member/control module to receive a message which contains the parameter value in question. The control module receives, preferably from the control means, time information for the desired function execution of the first member. The control module generates, as a function of the parameter value and the time information, an activation signal for the first member, which activation signal is produced in such a way that it takes into account the first member's present inertia, which can vary in accordance with the above. Upon receiving the message number in question, the control module preferably generates, with the aid of this message, a trigger signal for the first member so that the latter effects its function execution. A second detection member is moreover arranged to detect the actual function execution of the first member on account of the trigger signal and, in the event of a difference from the desired function execution, a signal is generated for the control unit which as a function of the last-mentioned signal adjusts the receiving member for receiving a message number which is different from the preceding message number and which represents another parameter value which comprises compensation for the existing inaccuracy between the desired and actual function execution and generates another trigger signal which is delayed or accelerated in relation to the first trigger signal. A variant of the above is that the receiving unit can transmit a message to the transmitting unit in order to cause the latter to transmit other parameters which it is expedient to obtain for achieving a good trigger point.

During system operation, the first detection member preferably generates in an essentially continuous manner signals associated with each parameter value, and in a corresponding manner there is essentially continuous transmission of the message numbers which represent the parameters in question on the bus connection. The second detection can comprise a sensor member which detects the first member's actual execution of its function. The second detection member can also comprise a time-measuring member which generates a signal which is dependent on the difference between a time instant for delivery of activation energy to the first member and a time instant when the first member has carried out its function. The control member can in this case be arranged to calculate a lead time, dependent on the time difference, in the form of one or more messages for activation of the first member. One transmitter member at a time preferably operates on the bus connection in order to avoid risks of collision between messages from different transmitters and, consequently, time delays which can jeopardise the trigger signal generation. The transmitter member continuously transmits the detected parameter or all the detected parameters, for which the receiver member can be adjusted from the control unit. Each message thus represents with its message number a value for the detected parameter(s) and at the same time the message can contain data which represents another quantity representing the action, state, and the like of the second member, for example angular velocity, direction, acceleration, and the like, an action, state, and the like of an article controlled by the first member, or a number of sensor elements arranged on the first member. With the aid of the information from the action, state, and the like and of data associated with a message transmitted and received in the receiver regarding another quantity/other quantities concerning the second member, for example angular velocity, acceleration, direction of rotation and the like, an actual event, for example final function establishment, in the first member can be calculated afterwards in a known manner.

The system for the communication protocol operates with different phases. A primary adjustment phase for start-up of the system is used, as well as a secondary adjustment phase in which a main processor/control member incorporated in the system gives instructions regarding trigger signals which are to be selected. In addition, an operating phase is used in which each subunit/slave incorporated in the system receives an assigned message/assigned messages in order to effect one or more trigger signals as a function of this message(s). The secondary adjustment phase and the operating phase can be repeated cyclically on instructions regarding new trigger points/trigger signals. In a case where the trigger points are not altered, the secondary adjustment phase is omitted. Further features of the new device will emerge from the description which follows.

The method is characterized, among other things, in that signals emanating from the particular parameter/parameters of the second member and dependent on each parameter value are transmitted by a transmission system operating with a well-defined time function and being of the type which comprises, on the one hand, a transmitter to which the emanating signals are conveyed, and a receiver which is connected to or forms a control module for the first member. A bus connection is arranged between the transmitter and receiver members. The transmission system operates with a message system in which the messages are preferably assigned message numbers and are transmitted in a certain queue order, preferably successively as a function of the number value. The signals which represent the different parameter values are preferably assigned different message numbers, for example the lowest parameter value is assigned the lowest message number, the next-lowest parameter value is assigned the next-lowest message number, and the like. The control module is controlled from a control unit incorporated in the system, for example a master unit, or is pre-programmed in order to be responsible for one or more message numbers. Time information, position, temperature, and the like are or will be assigned to the control module regarding the time, the position, the temperature etc. when the first member will have carried out its function.

With the aid of for example the parameter value and time information, an activation signal is generated which results in the function being executed at the desired time regardless of the inertia with which the first member operates in the case in question. In one embodiment, a trigger signal is generated in the control module for the first member as a function of each received message number, for which it has been made responsible, by the control unit. The function execution of the first member is detected, which can take place in a known manner by means of sensor members or with the aid of the action, state, and the like of the material, element, wire and the like which is controlled or acted upon with the aid of the first member, which in this case can serve as an actuation, holding or stopping member. In the case of a function detection where the function execution of the first member differs from that which is desired, a correction signal is generated and is used for producing, for example calculating, new control information for the control module which, when the new control information is received, is made responsible (instead) for a message number which differs from the first-mentioned message number or the first applicable message number. With the aid of the new message number, there is generated in the control module a trigger signal which is delayed or accelerated in relation to the first-mentioned trigger signals.

In accordance with the above, an exact and accurate system can be built up in conjunction with a product-manufacturing machine, unit, installation and the like, for example a textile machine. Even if the transmission paths between the signal-transmitting (signal-generating) point at the second member and the signal-receiving point have a considerable length, great accuracy can be obtained in the trigger signal generation for the first member, despite the fact that this is not constructed or chosen with advanced tolerance characteristics and little spread between different examples. Short distances between sensors and the communication modules together with data communication on which interferences can easily be detected and separated out (bit test and/or check total) gives an extremely reliable transmission system. The system permits transmission of other information when the transmission system is not used before the trigger signal messages.

BRIEF DESCRIPTION OF THE DRAWING(S)

A proposed embodiment of the present invention is described hereinbelow with reference to the attached drawing, in which.

DETAILED DESCRIPTION OF THE PREFERRED EMBODIMENTS

As an example a reference may be made to the case in which, in an additional installation for a machine, an object, unit and the like is to be released at a certain angle on a drive shaft used in the machine. The first member can consist of a magnet member which serves as a holding member and which as a function of a trigger signal will release the object, part and the like in question. The magnet member is subject to a certain delay between the supply of activation energy and the time when its member has carried out or executed its function. Such a delay differs from magnet to magnet and can vary for example, with temperature, material stress, material quality for one and the same electromagnet. Even greater variations can occur when magnets or the like from different suppliers and/or of different marks or models are used. The efficiency nowadays increased the machine, for thus impose increased requirements for a small spread between magnets and for each magnet used to be able to operate with unaltered function under different conditions. According to the present invention, the machine is used for ordering material release at a certain angle, at the same time as information is continuously picked up regarding angles so that a necessary lead time can be calculated. By virtue of the fact that the receiver module itself can determine which trigger message will be used, this can take into account all the variations which can occur at the function-increasing point without adjustments having to be made in the other parts of the system. The precision can thus increase in the system as a whole, without it being necessary to increase the requirement for each individual subcomponent. According to the invention, use is made of a known communication protocol/transmission system, see above. In this, a known circuit (Philips) can be used for transmitting messages, for example from 0 to 2032. In addition, an Intel circuit can be used for receiving one or more of the messages.

According to the present invention, a sensor is used or coupled to the main shaft/drive shaft and is read off by a microprocessor (CPU). For each degree, this transmits a message with a number, which corresponds to the degree number in question. It is also possible to add to the message the actual angular velocity and, if appropriate, also the direction of rotation and acceleration to provide the receiver module with further information for a better calculation of the time at which the function execution is to be started. There is thus transmitted on the bus connection a continuous stream of messages, one for each degree. Since only one module transmits trigger messages or other information on the bus connection, there is no risk of collision and, therefore, the transmission speed can be precisely known. The time from which the pulse sensor indicates until the message is transmitted can also be precisely known, which can take place in a known manner. With a pulse sensor with considerably more pulses than one per degree, the transmitter can also extra-polate values so that it transmits the correct value at the correct time. As speed, acceleration and the like are transmitted, the same calculation can also be carried out in the receiving module.

The receiver, the magnet control module, comprises a sensor which indicates the passage of the material, object or the like beyond the armature of the magnet. A main processor/master unit incorporated in a CAN system orders the module to release the object or similar at 90°. With adjusted default value, for example 88°, the module provides current to the magnet, and the time for the object, material or the like to pass from a holding position to a sensor position is measured. In order to obtain the trigger point 88°, the module ordered a CAN circuit incorporated in the CAN system to receive message number 88. When the circuit receives the message, it transmits an interrupt/activation signal to the microprocessor (CPU) which sets off the magnet coil current and starts a time counter. When the passage of the object or material is indicated, the counter is stopped and read off. If data is transmitted with the message, the data can also be read off from message 88 (for example angular velocity and acceleration). The module can then calculate when the object or the material was in actual fact released. Assume that this occurred at 91.45°. It then asks the CAN circuit or similar function module to pick up message 86 instead next time. When this message arrives, the module waits a time which corresponds to, for example, 0.55° and then sets off the magnet. If the machine/drive shaft does not change speed, the function execution for the first member will this time be correct. The circuits in the system CAN, TRAINET, and the like are rapid and can operate with a resolution of half a degree without problems, and this too in the case of rapid machines, that is rapid drive shaft rotations (for example 1200 rpm). Of course, not all the degrees of a turn need to be transmitted via the communication, but only those which are important for achieving a sufficiently good execution of the function which is to be triggered. An example which can be mentioned is that one function is to be obtained at 10 degrees and another at 180 degrees. In this case, all angles between 0 and 15 and between 160 and 190 degrees are expediently transmitted. The other degrees do not need to be transmitted, since it is not necessary to obtain any function at or around these degree numbers. It is also conceivable that in the one case between 0 and 15 degrees each degree is transmitted, whereas, between 160 and 190 degrees, only every second degree need be transmitted. In a more complex form, it is conceivable for the receiving unit to transmit such messages so that the transmitter only transmits those messages which are necessary for fulfilling the desired function. The transmitter must then take into account all the receiving units so that for these a sufficient number of trigger messages is transmitted.

A detailed exemplary embodiment is described below, with the following reference numbers being used.

Figure 1:
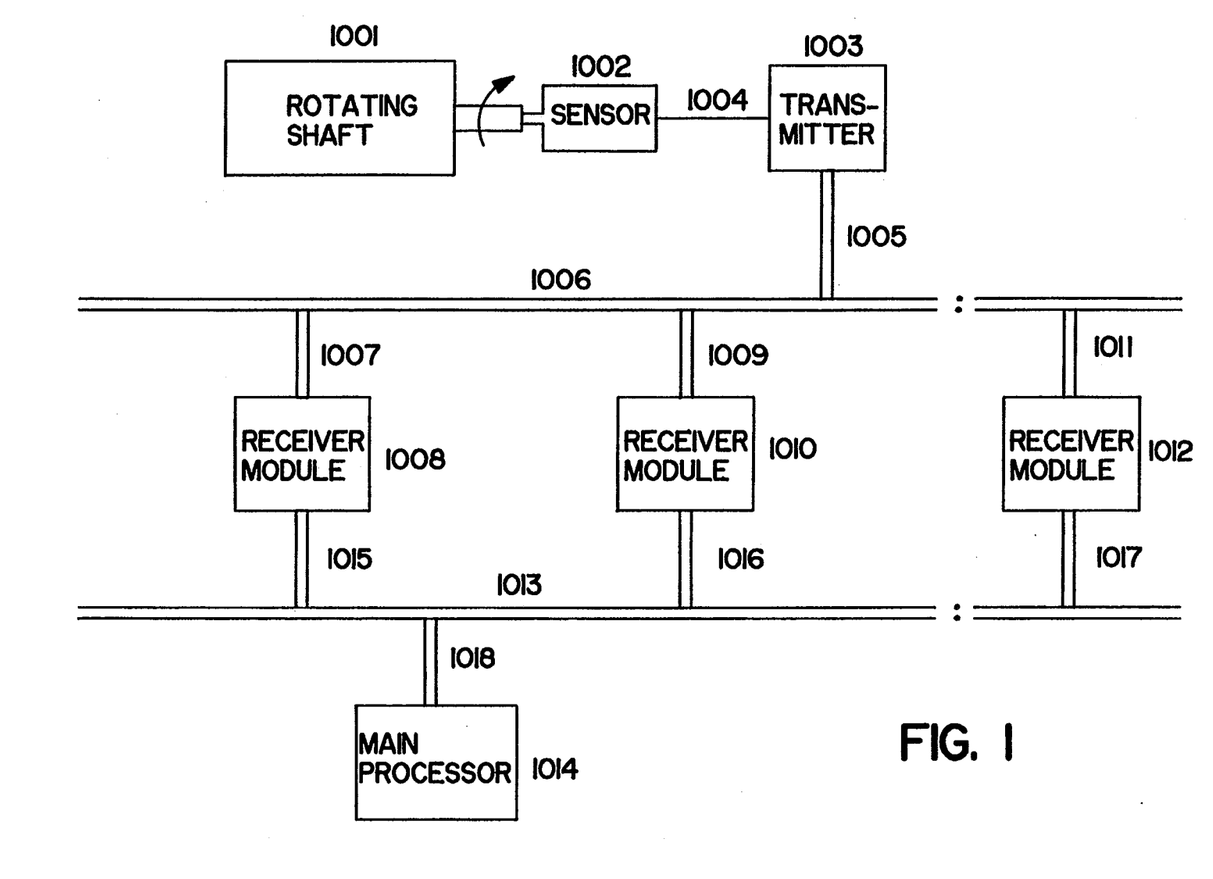
FIG. 1 is a block diagram of a transmission system used in the present, with a master 1014 and four slave modules. The buses 1006 and 1013 can in some cases, constitute a common bus.
Figure 2:
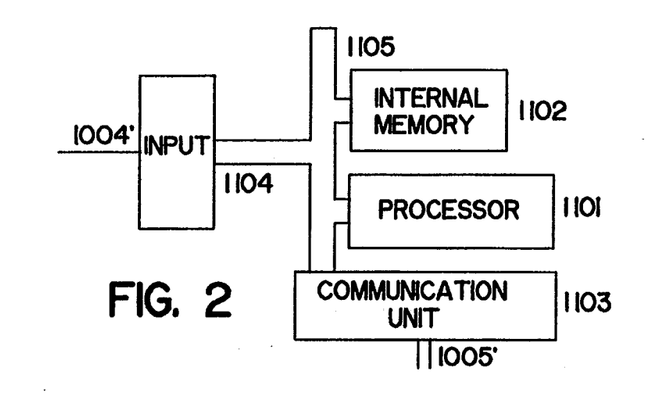
FIG. 2 shows in a block diagram form parts incorporated in the system in the module which transmits from the sensor the messages on the bus 1005' which gives trigger response in other receiving modules.
Figure 3:
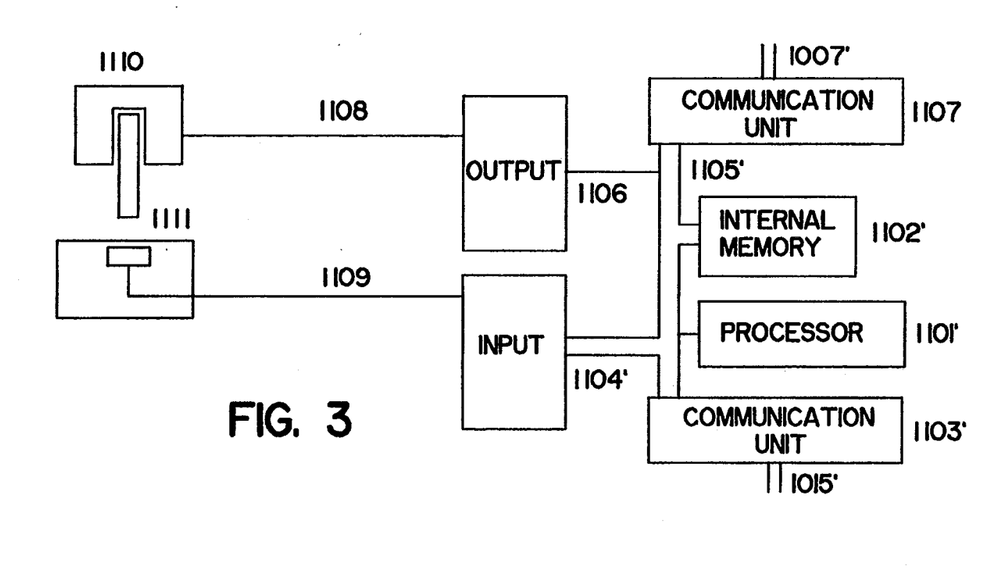
FIG. 3 shows in a block diagram form the parts which can be incorporated in the module which receives the trigger messages and as a function of the received trigger message performs a desired action on the received message.

FIG. 1
1001 Rotating shaft, direction of rotation arbitrary.
1002 Sensor, for example position in degrees.
1003 CAN adaptation, circuit which sends different messages for serving the sensor, sends the trigger messages and receives adjustments. This CAN circuit should be of the Philips type so that all message numbers in the CAN system can be used. The circuit can also be connected to a communication bus 1013.
1004 Conductor for trigger signal from sensor.
1005 First connection to CAN bus for trigger messages.
1006 CAN bus for trigger messages.
1007 Second connection to CAN bus for trigger messages.
1008 First handling processor which receives specific trigger messages from the CAN bus for trigger messages. The processor executes operation on trigger message, checks that the operation is executed at the correct time and adjusts the delay. The system is back-coupled. The processor receives and transmits information on the CAN bus for control.
1009 Connection to CAN bus for trigger messages.
1010 Second handling processor which receives specific trigger messages from the CAN bus for trigger messages. The processor executes operation at the correct time and adjusts the delay. It is incorporated in the back-coupled system and receives and transmits information on the CAN Bus for control.
1011 Connection to CAN bus for trigger messages.
1012 Third handling processor which receives specific trigger messages from the CAN bus for trigger messages. It is incorporated in the back-coupled system and receives and transmits information on the CAN bus for control.
1013 Second CAN bus for control.
1014 Main processor (master) which ensures that the system fulfils the desired total function.
1015 First connection to the said second CAN bus for control.
1016 Second connection to the second CAN bus for control.
1017 Third connection to the second CAN bus for control.
1018 Fourth connection to the second CAN bus for control.
FIG. 2
1101 Processor.
1102 Internal memory RAM and ROM.
1103 CAN circuit for connection to CAN bus for control.
1104 Adaptation circuit for sensor (input member).
1105 Internal bus in slave unit.
FIG. 3
1101' Processor.
1102' Internal memory RAM and ROM.
1103' CAN circuit for connection to CAN bus for trigger messages.
1104' Adaptation for sensor (input member) gives the delay from when the control pulse has been fired from the output member (1106).
1105' Internal bus in the slave.
1106 Adaptation circuit for control member (output member). The circuit gives a control signal to the physical unit which carries out the operation (in this case a magnetic hammer).
1107 CAN circuit for connection to CAN bus for trigger messages.
1108 Connection to control member (magnetic harsher).
1109 Connection to accelerometer or other suitable sensor.
1110 Control member in the form of magnetic hammer.
1111 Stop for magnetic hammer with sensor.

The system according to FIGS. 1–3 operates with three phases, and two of these can be repeated cyclically.

Phase 1: Primary adjustment phase takes place upon start-up (current supply) of the system. Basic adjustments are carried out.

Phase 2: Secondary adjustment phase takes place when the main processor gives instructions regarding new trigger points which are to be chosen.

Phase 3: Operating phase is when each slave (1008, 1010, 1012) waits, receives trigger message and/or executes handling.

Phases 2 and 3 can be repeated cyclically. Phase 1 can give instructions on trigger points and, if these are not altered, phase 2 disappears and in this case only phase 3 is repeated cyclically.

Phase 1: The main processor (1014) sends adjustment information to each slave (1008, 1010, 1012) regarding which messages are to be used. One of the slaves (1008, 1010, 1012) adjusts the parameters meters of the sensor slave (1003) and the messages which are to be used as trigger messages. Alternatively, the main processor (1014) with an extra CAN port which is connected to CAN bus (1006) for trigger messages can be used instead of one of the slaves (1008, 1010, 1012) being used for adaptation between the main processor (1014) and the sensor slave (1003). (Not shown in FIG. 1).

Phase 2: The main processor (1014) indicates new trigger points if so required. Each slave (1008, 1010, 1012) calculates its trigger point parameters based, on the one hand, on data from the main processor and, on the other hand, based on information from external/internal sensors (not included in the figure). The slaves then wait for each trigger event to occur.

Phase 3: Trigger event occurs when sensor (1002) transmits trigger signal (1004) to sensor slave (1003) which then transmits the correct trigger message on CAN bus for trigger messages performs the which accepts this trigger message performs the necessary operation and reconciles the calculated trigger point with the chosen trigger point which has been obtained from the main processor.

The function can alternatively be described as follows:

Phase 1: The main processor (1014) sends out a command to each handling slave (1008, 1010, 1012) which is then assigned its basic parameters. The main processor (1014) then sends a command to the sensor slave (1003) either through the handling slaves (for example 1010) or via a separate CAN bus connection to CAN bus for trigger message (1006, which is not shown in the figure concerned). These commands include information on the messages which are to be used, for example if the sensor (1002) gives the position in degrees between 0 and 359 but instead transmits messages with numbers in the range 1 to 360 where 360 corresponds to 0.

Phase 2: The main processor sends the different trigger points to each handling slave (1008, 1010, 1012) and appropriate commands to the slaves (1003, 1008, 1010, 1012) for altering resolution and interpretation of message numbers.

Phase 3: The handling slaves calculate which message number will start each operation. Here there is a back-coupled loop (see FIG. 12, 1104 and 1106). The shaft (1001) rotates in an arbitrary direction. The sensor (1002) indicates the direction and step and sends information on via connection (1004) to the sensor slave (1003) which immediately sends the corresponding trigger message on CAN bus for trigger message (1005, 1006) (implemented with interruption or polling). The handling slave (1008, 1010, 1012) which has this message as trigger point then executes phase 2 or phase 3 again.

In the above example it is assumed that the effecting module/control module receives only a message that activation will take place. However, the control module knows that the time for the execution of the function of the first member will take place later, that is knows that there is a certain inertia in the first member. In one exemplary embodiment, the control module receives the message regarding time information, for example from the control member. A function sequence can then be as follows:

1. The control module receives or possesses information on how long a period of time is available for execution of the function of the first member in relation to the message stream with the parameter values/degree numbers. The control module determines on the basis thereof which parameter value A will be received in order to initiate the control module's own operation. In addition, the CAN module is adjusted to receive a desired parameter value B regarding time information when the control module is expected to precisely fulfil the desired effect. The sensor (see 1111) gives a signal when the execution of the function has taken place exactly.

2. When the parameter value A is received in the control module, this starts the actual sequence.

3. Thereafter, the CAN module either generates a signal when B is received or when the signal from the sensor (see 1111) is received internally. The signals start a time counter which also indicates which signal was obtained first, for example + for B and − for the sensor signal.

4. When the sequence has been carried out, the microprocessor (CPU) of the module reads off the time in the counter, and in this way the module establishes how well the task has been achieved. If B and the sensor signal come simultaneously, a random selection of the signals can be made for example.

The sensor signal need not necessarily be generated by the control module, but can be obtained from any other suitable source in the system. The only requirement is that the time delay in the first member will be known or can be determined.

In the exemplary embodiment according to FIG. 4, the preconditions are as follows:

1. The software time and/or hardware time of the handling slave for starting time-critical operation on the output member is known, let this be $t_b$.

2. The time delay for "PRE TRIGG" from the sensor through the sensor slave to interruption in the handling slave is known, let this be $t_{rt}$.

3. The time delay for "REAL TRIGG" from the sensor through the sensor slave to interruption in the handling slave is known, let this be $t_{rt}$.

4. The time delay for "CONTROL TRIGG" from sensor used to interruption in the handling slave is known, let this be $t_{ct}$.

5. The system function of the output member (delay) is approximately known, let this be $t_{ct}$.

6. Shaft with sensor slave's system function (transmission function) is approximately known.

The following procedure is assumed:

Assume that an angular velocity $w_r$ of the shaft 1001 in FIG. 1 is approximately constant and function execution will take place at an angle $w_{rt}=150°$. The hammer 1110 in FIG. 3 with strike control sensor 1111 at the same time as the sensor slave indicates the angle $w_{rt}$.

Event:

Turn 1

The handling slave calculates the trigger point shift with given data.

$$(t_{pt}+t_b+t_o)*w_r=Dw$$

This means that the operation takes place DW degrees too late.

$$w_{pt}=w_{rt}-Dw$$

conclusion, choose $w_{pt}$ as "PRE TRIGG" but this can be improved by $t_{rt}$ and $t_{ct}$ being known, as well as the times when these two events have taken place (see block diagram). A hardware calculator can be used if maximum time resolution is to be achieved and started and stopped, respectively, by the two signals. The time difference $t_j$ between these two signals will be used for adjusting $w_{pt}$ at the next turn.

Turn 2

Now $t_j$ is known and compensated by $t_{rt}$ and $t_{ct}$. Now calculate new "PRE TRIGG"

$$(t_{pt}+t_b+t_o+t_j)*w=DW$$

$$w_{pt}=w_{rt}-DW$$

At the end of this cycle, a new $t_j$ is obtained.

A corresponding model is used if $w_r$ is not constant.

Figure 4:
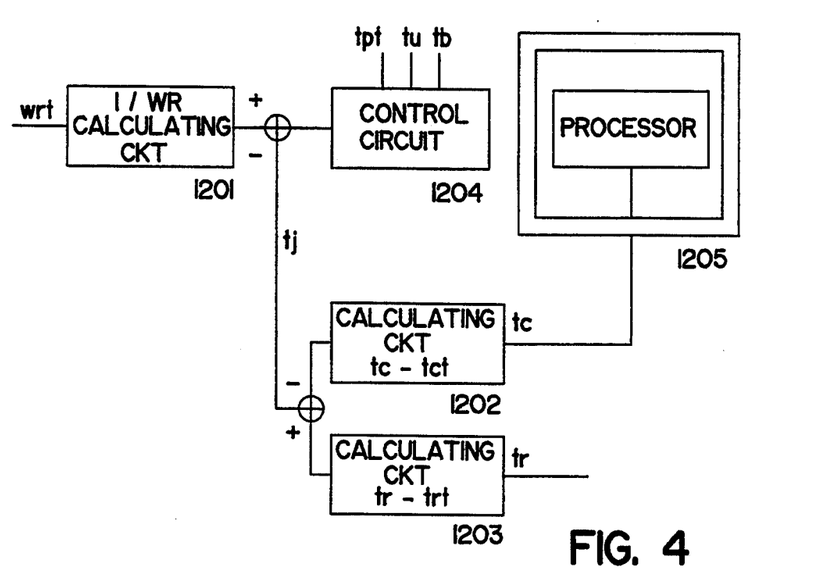
FIG. 4 shows how back coupling can be performed on the receiver module in order to achieve the correct delay between the trigger message and execution of the function.

In FIG. 4, calculating circuits of known type have been shown by 1201, 1202 and 1203. A control circuit is shown by 1204 and a processor, textile machine and the like is shown as 1205. The function of the different circuits will emerge from the context.

FIG. 1 describes in more detail a system where everything originates from the sensor 1002, which in this case is considered to be a sensor, for example, which indicates the angle of a shaft. There can be a number of such sensors with similar tasks in a system, but in FIG. 1 only one is shown. The sensor is acted upon by any physical property, in this case a rotating shaft 1001, which sits in a machine which the control system will control. The invention is particularly applicable when different parts in the machine are to be synchronized to some part in the machine. In this case, the shaft 1001 constitutes a mechanical master, on the basis of whose position other events in the machine will be carried out. The angle information from the sensor is transmitted via a conductor 1004 or other information carrier to the transmitter member 1003. The transmitter member 1003 can have functions in the system other than transmitting angle information, but in this example this is not shown. The fact that in a machine or a system there is a main shaft to which all other functioning in a machine will be synchronized is well known. This is usually carried out mechanically by other parts in the machine being connected to the shaft mechanically with gear wheels, belts, drive shafts and the like. It is also possible for the synchronization with the main shaft to be carried out by angle or position information being transmitted to other units by virtue of the fact that the conductor 1004 is connected to all other units so that all the units concerned can read off the position directly. In this case the information goes via a transmitter member 1003 which transmits the information as a message on a communication conductor 1005 which, for example, can follow the specification for the CAN system. The transmitted information can be picked up by the modules 1008, 1010 and 1012 and, in cases where the communication channels 1006 and 1013 are one and the same, also by the module 1014. In FIG. 1, the system is divided into two communication channels 1006 and 1013. The channel 1006 is used for trigger messages and the channel 1013 is used for other information. The advantage of this is that the trigger information can be transmitted without being disrupted by other transmission in the case of a restriction that it is only 1003 which may send on 1006. All other control and information transmission is then conducted via the channel 1013. In the case where the transmitter member 1003 must also obtain information, this too must have two communication ports like the modules 1008, 1010 and 1012, so that connection to the communication channel 1013 can take place. The connections 1005, 1007, 1009 and 1011 are physical connections of each module 1003, 1008, 1010 and 1012 to the communication bus 1006. These connections consist first and foremost of a physical connection to the information carrier 1006, which can be a conventional electrical conductor, but optical and radio transmission are also possible. In the connection there must also be an adaptation between the way in which information is present on 1006 and how the information will appear in the modules where it is generally treated by a computer which generally operates with digital levels of 0 and 5 volts in accordance with the CMOS or TTL specification. In a similar way the modules 1008, 1010, 1012 and 1014 are connected to the channel 1013. In cases where trigger information can be mixed with the remaining information in the system, the connections 1006 and 1013 can be one and the same conductor. In such a case, only one connection of the modules 1008, 1010 and 1012 to the communication conductor (1013/1006 is needed, with the result that, for example, the connections 1007, 1016 and 1011 can be removed. There can be, however, other reasons, for example limited function in the communication circuits 1107 or 1103' which mean that the same module can have a number of connections to the same bus.

FIG. 2 shows a more detailed embodiment of the module 1003 according to FIG. 1. There is normally a processor in the module, which manages controls the function of the module. This processor 1101 follows a program which is stored in a memory 1102. This memory is normally divided into two parts, one for the program, which normally it is only possible to read after it has once been programmed, and a part which can both be read and written for storing occasional information, data and programs. In order for the processor to be able to cooperate with the surroundings, different types of connection possibilities are needed. Two such possibilities are shown in the figure. One connection 1104 is included in order to convert the information from the angle sensor 1002 via the conductor 1004'/1004 to a digital word which can be read and thereafter interpreted in the processor's logic unit or directly written in the memory or transmitted directly to 1103 via the adaptation 1005'/1005 and the communication line 1006. In order for the different parts 1104, 1102, 1101 and 1103 to be Able to cooperate, they are coupled together with the databus 1105 in the module 1003. This databus consists of address and data lines, and control lines to the latter. In addition to this there are voltage feed, clock signals and other signals which can go to parts or all of the units which are connected to the bus. The figure does not show the voltage feed, clocks, capacitors and other parts which are included in all modules with microprocessors. The communication unit 1103 is an important part if the invention is to achieve the desired function. This unit is normally manufactured using the same basic technology as a microprocessor, that is, it operates with CMOS or TTL levels and operates digitally with two binary levels. Since the communication can take place with other signal levels than CMOS/TTL, in optical or modulated manner, in most cases an adaptation 1005'/1005 is needed before information can be transmitted on the communication conductor 1006. The task of the communication unit 1103 is to ensure that information which is to be transmitted arrives at the bus in such a way that the other units which read in the information from the bus receive it in an unambiguous way. The task can be divided into the following parts.

1. Ensure that the information arrives at the bus 1006 in such a way that it does not collide with other information transmission.

2. Ensure that information arrives at the correct speed, so that the other units interpret each part of the information in a correct and unambiguous manner.

3. Ensure that the different parts in the transmission are in the order which the receivers require.

4. In addition, in some cases the circuit can check that information appears correctly on the communication line by simultaneously reading in information from it and comparing with transmitted information. It is also possible for the transmitter to transmit a check total which the received units can then compare with the check total which they calculate on received information.

FIG. 3 shows in detail the module 1008 in FIG. 1. The module receives the information from the transmitter module 1003. The structure of module 1008 is in many ways similar to that of 1003. It comprises a processor 1101' which is connected via an internal databus 1005' to a memory 1102' and a communication unit 1103' and an adaptation to the surroundings 1104' which can be the same as or of a type similar to 1104. There can be times when 1003 and 1008 can be identical in purely physical terms. After start-up, different tasks are received. By choosing from different programs in the program memory 1102 or by transmitting the function program after start-up, they can thereafter perform different tasks. In the same way the hardware can be programmed or used in different ways after start-up. In comparison with FIG. 2, the unit in FIG. 3 has a further two units which are not present or shown in FIG. 1. This is a communication unit 1107 and control output/adaptation for an external unit 1110, the hammer, which is controlled via an information carrier 1108. In this case, no angle sensor is connected to the module via 1104', but another type of sensor 1111 which has been connected via the conductor 1109.

FIG. 4 describes with a block diagram how the unit 1008 (FIG. 1) or 503 (FIG. 5) can process the information in order to obtain the function desired in the present invention. FIG. 3 shows a typical set up where this algorithm can be used. Also 503 together with 506 and 507 is a good example, where 506 and 507 can be compared with 1111 and 1110. The important point for solving the existing problem is to keep track of the delays in the system. This is quite common. The new aspect of the present invention is, among other things, how some of these times can be calculated and how others can be adjusted in order to obtain a better function for the overall system. The time tpt from when a certain angle at 1003 is known until this information has reached 1008 will be known with sufficient accuracy, as will the time tb which it takes before the unit 1008 is able to transmit the signal to 1110 via 1108. In addition, the reaction time to can be calculated roughly, in addition to the variations which occur on account of environmental factors, manufacturing method and brand of manufacture. When the annular velocity wr is known, it is possible to calculate the size of the angle Dw which the shaft 1001 moves through during the total period of this time. By placing the trigger point wpt at Dw degrees before wrt, which is the angle in which the function is desired, the correct function can be obtained despite time delays in the system. With the aid of the sensor 1111 it is possible to record at what time tc the function was obtained. This signal from 1111 too can receive a delay. If %he time is long, compensation can be carried out by taking from the recorded time this known delay tct, which is carried out in 1202. The variations in the delay on the signal from 1111 may not be too great, and precision will then be maintained. By virtue of the fact that, for example, 1003 transmits a message when tripping is to take place, 1008 can check that triggering has taken place at the correct time. As the delay from 1003 to 1008 is known, 1008 can compensate for this delay, which is carried out in 1203. The time when it actually took place is obtained from 1202, and the time when it should have occurred is obtained from 1203. By taking the difference between these, the difference tj between these times is obtained. By introducing this time difference into the calculation of Dw, a better wtp can be calculated. By continuously adjusting in this way for unknown time delays, the time difference tj can be kept close to zero. The fact that uncertainty is great upon start-up is often no problem, since a machine in most cases goes relatively slowly, for which reason the time is not so critical. In the case where it is critical right from the start, 1008 may carry out a blind firing of 1110 and measure the time delay before the machine starts.

Figure 5:
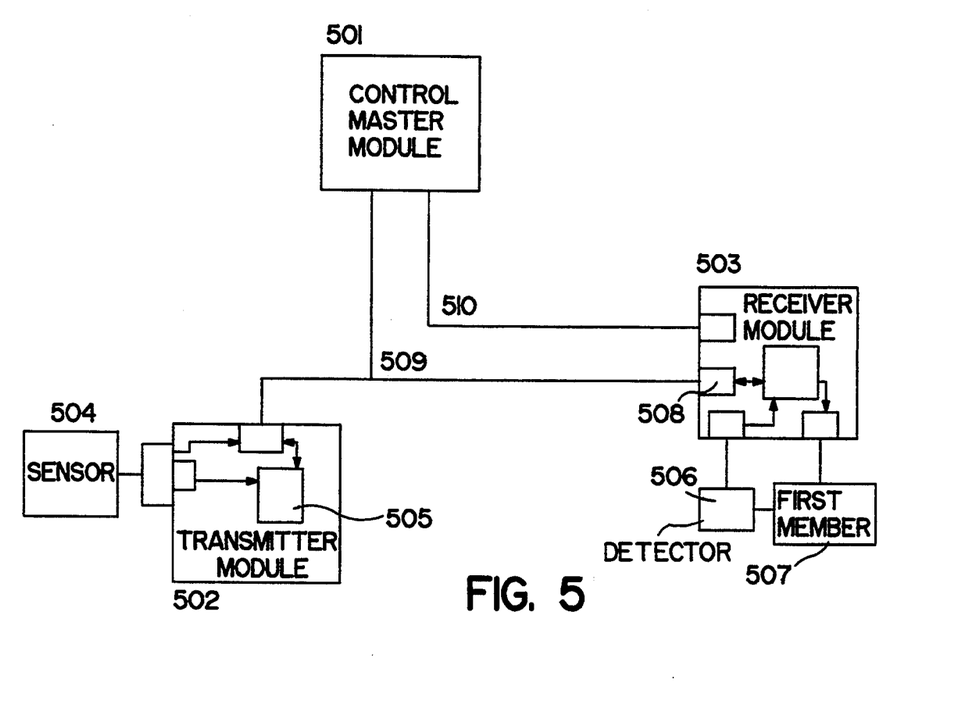
FIG. 5 shows a system with control member, control module and transmitter and sensor members.

FIG. 5 is a system similar to that in FIG. 1, but constructed in a somewhat different way. The overriding control member 501 will control the system. This unit is a master unit in the system or at least master over communciation. In some cases this master is not needed, but in these cases the communication method is unlimited since uncontrolled alteration on the communication would create the risk of chaos. The communication channel 509 is necessary for the module 501, 502 and 503 to be able to exchange information. In the case where the trigger information is extremely critical and requires great reliability in the time it takes to transmit the information, there can be a further communication channel 510. The communication 510 can go to all or parts of the system. Connected to the transmitter member 502 is a sensor, compare with 1002 in FIG. 1. In a start-up, the communication must take place in accordance with established rules which are programmed in each module 501, 502 and 503. If appropriate, further information on the communication procedure can be indicated by 501, for example which trigger messages are to be transmitted from 502 on 509 and/or on which trigger messages 503 will activate its first member 507. It can happen that all sensor values from 504 give one message or that on 502 there is a selection by means of a combination of hardware and software 505 or as is indicated in the figure directly with hardware through a direct coupling between the connection for the sensor member 504 and the communication unit which transmits on 509. The receiver member 508 can be constructed in such a way that it receives all the messages which are transmitted on 509 or that it has selection possibilities so that only those messages which have significance for the module 503 activate a function of the latter. When a trigger message arrives at 503, there is after a certain time an activation of the first member 507, which has intrinsically in itself delays dependent on physical properties. These delays in 507 can vary depending on manufacturing variations, ageing and environmental factors, for example pressure and temperature. With the aid of a detector 506, it is possible to measure when 507 has attained the desired function, for example when a drawing magnet has reached the desired position. The invention is based on the fact that it is possible to guarantee the time, with sufficiently great accuracy, from when a certain angle is obtained at 504 to when a signal for activation is transmitted from 503 to 507. With the aid of 506, it is in addition possible to measure the time from when a signal is given to 507 to when the desired function at 507 has been achieved. It has also been assumed that the time from when the signal is transmitted from 503 to when 507 has become activated does not vary more than the interval within the fault tolerance between two consecutive activations. By means of a calculation in 503 it is then possible to calculate the time when the signal to 507 will be transmitted so that activation of 507 takes place at the correct point in time relative to a certain angle. The activation of 507 will normally take place at a certain position at 504. This means that the time when the signal is transmitted from 503 to 507 also depends on which angular velocity applies at the time. A trigger message must be transmitted in such good time before activation of 507 that 503 has time to execute the activation, alternatively that 503 chooses a trigger message which is so far in advance that the task can be executed. This choice of which trigger message is to be chosen can be made in a number of ways. The simplest way is that 502 transmits all angles and 503 chooses the trigger point which it considers to be best for the case in question. Alternatively, 503 can transmit information to 502 and indicate which angle is to be transmitted as trigger angle. Another alternative is that 502 transmits one or more trigger points and that 503 can compensate for the delay between receiving and trigger point until the signal to 507 is transmitted in order to achieve activation at the correct time.

The invention is not limited to the embodiment shown above as an example, but can be subjected to modifications in accordance with the following patent claims and the inventive concept.

I claim:

1. An apparatus including:
a first member for executing a desired function or action which is controllable as a function of at least one parameter characteristic for a second member;
a first detection means for detecting signals corresponding to values of said at least one parameter of said second member;
at least one transmitter for receiving said detected signals and for assigning coded/numbered messages for each value of said parameter;
at least one receiver for controlling said desired action of said first member;
a connection bus for signal transmission between said transmitter and said receiver;
said signals being transmitted in the form of said coded/numbered messages in a predetermined order, with well defined transmission times between said first detection means and said transmitter and between said transmitter and said receiver; and
control means for transmitting to said receiver at least one of:
a) a desired parameter value at which a corresponding desired function or action is to be executed by the first member, and
b) a desired message number to be selected;
said receiver obtaining said desired message number or, based on a said desired parameter value and the time information for the desired action or function of the first member, selecting and receiving a corresponding message number containing said parameter value;
said receiver generating based on said message number an activation signal for said first member;
said message number being selected to ensure execution of said function by said first member at the time corresponding to said desired parameter value.

2. An apparatus including:
a first member for executing a desired action which is controllable as a function of at least one parameter characteristic for a second member;
a first detection means for detecting signals corresponding to values of said at least one parameter of said second member;
at least one transmitter for receiving said detected signals and for assigning coded/numbered messages for each value of said parameter;
at least one receiver for controlling said desired action of said first member;
a connection bus for signal transmission between said transmitter and said receiver;
said signals being transmitted in the form of said coded/numbered messages in a predetermined order, with well defined transmission times between said first detection means and said transmitter and between said transmitter and said receiver; and
control means for transmitting to said receiver at least one of:
a) a desired parameter value at which a corresponding desired function or action is to be executed by the first member, and
b) a desired message number to be selected;
said receiver selecting said desired message number or, based on a said desired parameter value determining and selecting a corresponding message number containing said parameter value;
said receiver, based on said message number and the time information for the desired action or function of the first member, determining and generating an activation signal for said first member which ensures execution of said function by said first member at the time or position of said first member corresponding to said desired parameter value.

3. An apparatus according to claim 2, wherein said generated activation signal is calculated by said receiver to take into account the present inertia of the first member.

4. An apparatus according to claim 1, wherein said receiver includes a control module which generates said activation signal for effecting execution of function by said first member, and said apparatus further comprises a second detection means for detecting the actual execution of the function of said first member based on said activation signal and, wherein in the event of a difference between said desired and actual execution, said control module is adapted to select another message number transmitted on said connection bus which is different from the preceding message number and which represents another parameter value in order to provide compensation for the existing inaccuracy between the desired and actual function execution and to generate another activation signal which is delayed or accelerated in relation to the first activation signal.

5. An apparatus according to claim 1, wherein said first detection means emits said detected signals associated with each parameter value in an essentially continuous manner, and wherein said transmitter transmits on said bus connection in an essentially continuous manner the numbered messages associated with each parameter value.

6. An apparatus according to claim 2, wherein said second detection means comprises a sensor which detects the actual execution of the function of the first member, and a time-measuring device which generates a signal dependent on the difference between a time instant for the delivery of activation energy to the first member and a time instant when the first member has executed its function, and wherein said control means calculates a lead time or delay as a function of said time difference, and based thereon at least one message for the activation of the first member.

7. An apparatus according to claim 1, wherein one single transmitter at a time operates on the connection bus in order to avoid the risk of collision between messages from different transmitter members, and wherein the transmitter transmits continuously at least such detected parameter which the receiver was requested to select by said control means.

8. An apparatus according to claim 1, wherein each numbered/coded message corresponds to said value detected parameter and in addition contains data which represents another quantity characteristic of said second member.

9. An apparatus according to claim 6, wherein said another quantity includes at least one of angular velocity, direction of rotation and acceleration.

10. An apparatus according to claim 1, wherein the action or state of one of an object, material and element controlled by the first member is detected by at least one sensor element arranged on the first member, and wherein based on the information detected by said sensor numbered message is accepted in the receiver with said another quantity regarding said second member, and a final function of the first member can be calculated afterwards.

11. An apparatus according to claim 1, wherein the apparatus operates with different phases, a primary adjustment phase for startup of the apparatus, a secondary adjustment phase in which a main processor constituting said control means provides instructions about function implementation which is to be chosen, and an operating phase in which each subunit/control module incorporated in the apparatus receives assigned message(s) in order to generate activation signal(s) on the basis thereof, wherein the secondary adjustment phase and the operating phase are repeated cyclically upon instructions regarding new activation point, and wherein in the case when the activation point(s) is/are not altered, the secondary adjustment phase is omitted.

12. An apparatus according to claim 1, wherein the receiver independently selects correct numbered message and wherein a number of receivers are connected to the connection bus.

13. An apparatus according to claim 11, wherein said control unit includes said main processor which sends out a command signal to each subunit module which thus obtains its parameter information, wherein the main processor transmits said command to a sensor either through one of the transmitter units or via the bus connection for messages, the command comprising the messages which are to be used, wherein the main processor transmits different activation points to each subunit and if appropriate, commands to the sensor in order to alter resolution and interpretation of message numbers, wherein the subunits calculate which message member will start each operation, wherein a back-coupling loop is incorporated, wherein the sensor indicates another parameter quantity and sends information onwards via a connection to the sensor which immediately sends the corresponding activation message on the bus connection for obtaining an activation message which is implemented with interruption or polling, and wherein each subunit which has this message as an activation point executes the secondary adjustment phase or operating phase again.

14. A method for controlling an apparatus including a first member for executing a desired action which is controllable as a function of at least one parameter characteristic for a second member, said method comprising the steps of:

detecting signals corresponding to values of said at least one parameter of said second member by a first detection means;

supplying said detected signals to a transmitter in which coded/numbered messages are assigned for each value of said parameter;

transmitting signals from said transmitter on a connection bus to receiver means including a control module and arranged for controlling of said first member, said signals being transmitted in the form of said coded/numbered messages in a predetermined order, with well defined transmission times between said first detection means and said transmitter and between said transmitter and said receiver means; and controlling said receiver means by a control means to obtain a message number representing a desired parameter value, based on the time information for the desired action or function of the first member and said parameter value;

generating based on said message number an activation signal for the first member;

said message number being selected to ensure execution of said function by said first member at the time corresponding to said desired parameter value.

15. A method according to claim 14, wherein said activation signal is produced to take into account the present inertia of the first member.

16. A method according to claim 14, detecting the actual function execution of the first member, and in the event that said actual function execution differs from the desired function execution, generating a further signal to be used for producing new control information for the control module which, upon receiving the new control information, is adapted to select another message number which differs from the first message number, and based on said new message number, generating by said control module an activation signal which is delayed or accelerated in relation to the first activation signal.

* * * * *